United States Patent
Smyros et al.

(10) Patent No.: US 9,575,958 B1
(45) Date of Patent: Feb. 21, 2017

(54) DIFFERENTIATION TESTING

(71) Applicants: Athena Ann Smyros, Gunter, TX (US); Constantine John Smyros, Gunter, TX (US)

(72) Inventors: Athena Ann Smyros, Gunter, TX (US); Constantine John Smyros, Gunter, TX (US)

(*) Notice: Subject to any disclaimer, the term of this patent is extended or adjusted under 35 U.S.C. 154(b) by 0 days.

(21) Appl. No.: 14/268,581

(22) Filed: May 2, 2014

Related U.S. Application Data

(60) Provisional application No. 61/818,904, filed on May 2, 2013.

(51) Int. Cl.
G06F 17/27 (2006.01)
G06F 17/21 (2006.01)

(52) U.S. Cl.
CPC ................................ G06F 17/2765 (2013.01)

(58) Field of Classification Search
USPC ..................................................... 704/1–10
See application file for complete search history.

(56) References Cited

U.S. PATENT DOCUMENTS

| | | | | |
|---|---|---|---|---|
| 5,963,940 A * | 10/1999 | Liddy | | G06F 17/30654 |
| 6,026,388 A * | 2/2000 | Liddy | | G06F 17/30654 |
| 6,081,774 A * | 6/2000 | de Hita | | G06F 17/30663 704/9 |
| 6,185,531 B1 * | 2/2001 | Schwartz | | G06F 17/271 704/236 |
| 6,473,730 B1 * | 10/2002 | McKeown | | G06F 17/2705 704/9 |
| 6,629,097 B1 * | 9/2003 | Keith | | G06F 17/30598 |
| 7,197,449 B2 * | 3/2007 | Hu | | G06F 17/278 704/1 |
| 7,251,781 B2 * | 7/2007 | Batchilo | | G06F 17/2715 704/9 |
| 7,496,567 B1 * | 2/2009 | Steichen | | G06F 17/30707 |
| 7,548,917 B2 * | 6/2009 | Nelson | | G06F 17/30722 |
| 7,567,959 B2 * | 7/2009 | Patterson | | G06F 17/30616 |
| 7,593,920 B2 * | 9/2009 | Jackson | | G06F 17/3061 |
| 7,707,206 B2 * | 4/2010 | Encina | | G06F 17/30864 707/716 |
| 7,882,143 B2 * | 2/2011 | Smyros | | G06F 17/30091 706/50 |
| 8,010,342 B2 * | 8/2011 | Uchimoto | | G06F 17/277 704/1 |
| 8,265,925 B2 * | 9/2012 | Aarskog | | G06F 17/271 704/1 |
| 8,914,722 B2 * | 12/2014 | Milton, Jr. | | G06F 17/241 715/255 |
| 8,918,386 B2 * | 12/2014 | Smyros | | G06F 17/30613 707/707 |
| 8,965,881 B2 * | 2/2015 | Smyros | | G06F 17/30675 707/723 |
| 2003/0083862 A1 * | 5/2003 | Hu | | G06F 17/2755 704/9 |
| 2003/0130837 A1 * | 7/2003 | Batchilo | | G06F 17/2715 704/9 |

(Continued)

*Primary Examiner* — Edgar Guerra-Erazo
(74) *Attorney, Agent, or Firm* — Slater Matsil, LLP

(57) ABSTRACT

Differentiation testing is used to determine the usefulness of a term on a single-term basis or within a set of terms. Differentiation testing is performed by comparing an input against other input or a comparison set.

16 Claims, 2 Drawing Sheets

Differentiation Testing

(56) References Cited

U.S. PATENT DOCUMENTS

| | | | | |
|---|---|---|---|---|
| 2005/0108001 A1* | 5/2005 | Aarskog | G06F 17/271 | 704/10 |
| 2005/0226511 A1* | 10/2005 | Short | G06K 9/6253 | 382/225 |
| 2006/0106792 A1* | 5/2006 | Patterson | G06F 17/30616 | |
| 2007/0050356 A1* | 3/2007 | Amadio | G06F 17/3071 | |
| 2007/0214097 A1* | 9/2007 | Parsons | G06F 17/30864 | 706/12 |
| 2007/0260564 A1* | 11/2007 | Peters | G06F 17/27 | 706/14 |
| 2007/0271086 A1* | 11/2007 | Peters | G06F 17/211 | 704/9 |
| 2008/0077570 A1* | 3/2008 | Tang | G06F 17/30684 | |
| 2008/0133482 A1* | 6/2008 | Anick | G06F 17/30696 | |
| 2008/0140616 A1* | 6/2008 | Encina | G06F 17/30864 | |
| 2008/0201130 A1* | 8/2008 | Peters | G06F 17/27 | 704/9 |
| 2009/0089046 A1* | 4/2009 | Uchimoto | G06F 17/2795 | 704/9 |
| 2009/0099996 A1* | 4/2009 | Stefik | G06F 17/30648 | 706/54 |
| 2010/0070485 A1* | 3/2010 | Parsons | G06F 17/30864 | 707/709 |
| 2010/0114561 A1* | 5/2010 | Yasin | G06F 17/3071 | 704/9 |
| 2011/0106743 A1* | 5/2011 | Duchon | G06F 17/30705 | 706/46 |
| 2013/0054564 A1* | 2/2013 | Smyros | G06F 17/30613 | 707/711 |
| 2014/0006014 A1* | 1/2014 | Milton, Jr. | G06F 17/241 | 704/9 |
| 2014/0172417 A1* | 6/2014 | Monk, II | G06F 17/2785 | 704/9 |
| 2014/0222433 A1* | 8/2014 | Govrin | G06Q 40/02 | 704/260 |
| 2016/0012056 A1* | 1/2016 | Smyros | G06F 17/30675 | 707/728 |

* cited by examiner

DIFFERENTIATION TESTING

DIFFERENTIATION TESTING

RELATED APPLICATIONS

This application claims priority from Provisional Application No. 61/818,904, "DIFFERENTIATION TESTING", filed 2 May 2013, the disclosure of which is hereby incorporated herein by reference.

BACKGROUND

Currently, a myriad of communication devices are being rapidly introduced that need to interact with natural language in an unstructured manner. Communication systems are finding it difficult to keep pace with the introduction of devices as well as the growth of information.

BRIEF DESCRIPTION OF THE DRAWINGS

The accompanying drawing is incorporated in and are a part of this specification. Understanding that this drawing illustrate only typical embodiments of the invention and are not therefore to be considered to be limiting of its scope, the invention will be described and explained more fully through the use of the accompanying drawing in which.

DESCRIPTION OF THE INVENTION

Figure 1:
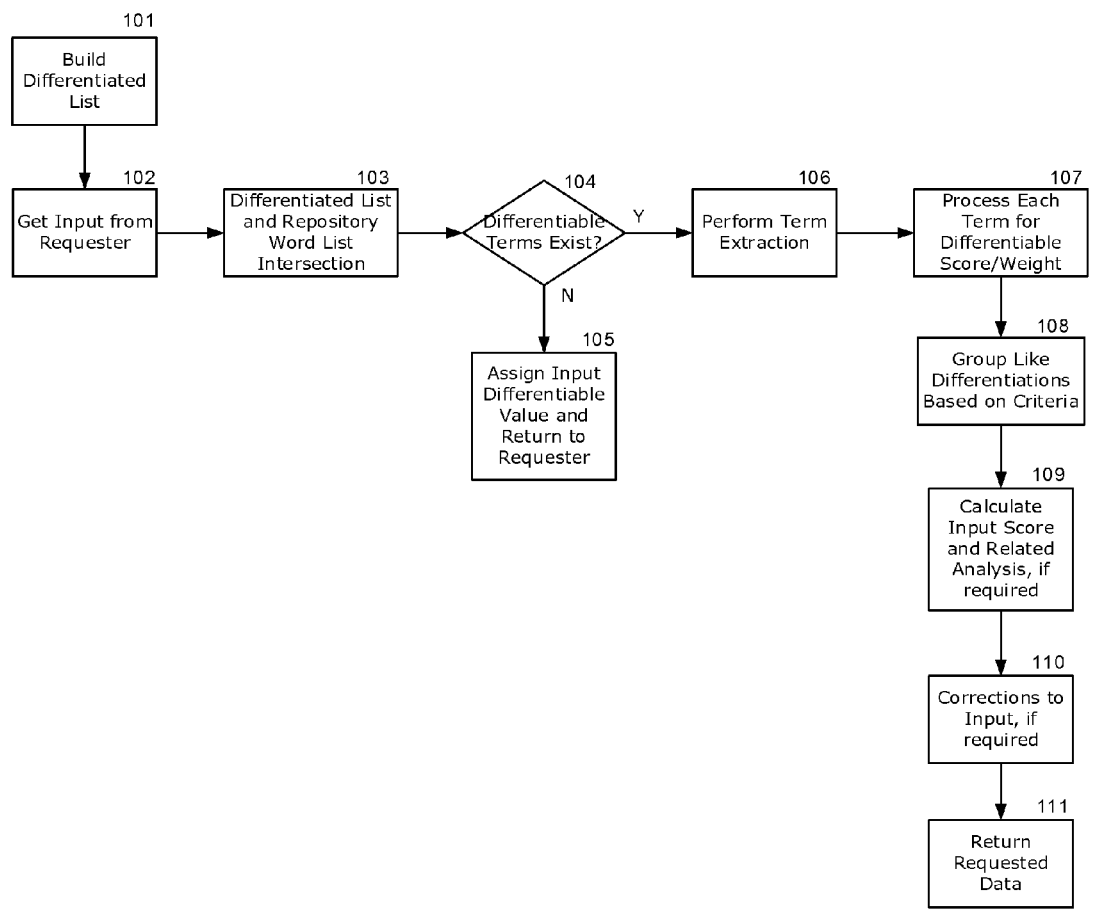
FIG. 1 illustrates the differentiation flowchart that is usable with the embodiments described herein.

Differentiation in language starts with the set of terms used in the language, such as words, numbers, alphabetical and/or numerical codes, etc. This forms the largest language set of words that form the basis for most language analysis that concentrates on using meaning to perform useful functions. This term list may be similar to a dictionary of terms for a language, but may include terms normally not found in dictionaries, such as email addresses, phone numbers, product codes, and other such information. This list is then the largest set of usable terms within the language. This set contains all such terms, and all such possible combinations that are currently usable within a repository. Note that the term list is not all the possible combinations within a given language's alphabet, since it generally contains numbers like integers and such numbers are an infinite set that is not usable for language operations on a computer. For instance, a company repository does not contain all the possible combinations of the alphabet in a given language, just those that have meaning at the point in time that the repository exists and is being analyzed by the system.

From this maximum set of terms, there needs to be, for any language-based functions performed by a computer, ways of distinguishing one term from another within a fixed set of meaning, such as a dictionary sense of the meaning of a word. This refers to the ability of a term to be put into a set of meanings that does not require further modification or explanation. Hence, such a term can be used to separate one text stream from another. For instance, the use of the term "application" does not indicate the fixed meaning that would allow it to be placed into a set of meanings without some explanation of "what kind of application" is being indicated here. It could be an insurance application, a software application, a car paint application, etc. Therefore, this term "application" is not useful on its own to distinguish itself from another text stream that contains the same term without requiring more terms to put it into a fixed meaning that is useful to perform any analysis. This is a nondifferentiated term. This can be contrasted with the term "fireplace", which has a fixed meaning that is useful to perform analysis and is a differentiated term. The type of fireplace enhances the meaning but does not alter the fixed meaning of fireplace, as in the above examples, where the word application has various fixed meanings that require more terms to put it in such fixed meanings.

Differentiation testing is used to determine the usefulness of a term on a single-term basis or within a set of terms. Note that the term may also be a separator between one text stream and another text stream in any language. Differential testing may use any form of text as an input. For example a message, file, blog, document, email, as well as input directly from a user or another request from a system, can be used as input. Differential testing involves performing a comparison between the input against one or more members of a repository or comparison set, depending on the implementation. Note that the input may comprise a plurality of different input types. Thus, input can check for differentiation with other input, in addition to comparing input to a comparison set. The input is checked for differentiation to the terms in each document in the undifferentiated comparison set or it may be compared in general after filtering. There is no requirement that both or all operands of a comparison require differentiation to get the benefits of the differentiated input. Any text stream within the system can be used at any time to run differentiated testing.

FIG. 1 illustrates a flowchart that is usable with the system. The differentiation list is a set of terms 101, usually a single TU in most languages, including English, that are considered to be differentiable in a language. These may be restricted by part of speech (POS), such as noun or verb. Some languages, such as English, can count all verbs as nondifferentiable to some degree. There may be both a binary classification or an n-ary classification scheme used separately or for the entire set of POS used in a given language; this may also vary based on implementation since while POS is normally used to construct a list; the list may be constructed from any metric that causes something to be differentiated from another. The number of total terms is less than the number of differentiable terms in a given language. Implication such as pronoun usage will cause measurement problems for implementations that do not take into account such uses, and also are not necessarily directly differentiable, depending on their antecedent. Each list that is generated is based on a specific language, and some languages may be difficult to classify at the term level, especially idiomatic-based pictorial (character) used to construct sentences, as in Chinese.

User input 102 is the input in text form or a nontext communication method that has been converted to text form. There is no restriction on the size of the input. In addition, the output required from the system can be sent or a default for a particular implementation can be used.

There are several variables that need to be measured, depending on the implementation and its scope of input. One of these is writing type. Generally speaking, from a discourse level, there are four basic writing types—expository, argumentation, description and narration. The writing type indicates the purpose for the communication—such as technical manuals or textbooks (expository), marketing collateral or job applications (argumentation), news stories or poetry (description), and novels or biographies (narration). There are several different types of writing that are used throughout a given language ID, and these may occur at random within any repository even when the repository is limited in scope, such as representing a single device or a single information domain.

Another variable that needs to be measured is writing style—some writing styles are terse; others contain significant modification or extra words based on use of inversion and other such sentence constructions. This refers to the range of expression that is possible within a language, and differentiation can be measured without regard to such expression ranges. The most important measure in processing the input is the apparent level of summarization; it triggers the use of differentiation is when the text is already in a summarized or highly condensed form, and lacks a single particular focus. Then, the use of differentiation is very important for the development of an outline/hierarchy or a summary when various language analyzers are used, such as topical, date, and location.

Some measurements of differentiation may involve the use of a functional scope, which can be used to limit the operation of the measurement of differentiation, such as restricting the measure to certain amount of text, such as a document, message, section of a file, a single input, or a part of or even an entire repository. The scope can be defined as the input range over and including the repository itself. For a given implementation, there may be a document scope, a section of a document scope, a paragraph scope, or a term unit (TU) scope. The TU represents a discrete word, number, or other symbol in the language that has specific meaning within the language. The differentiable measure then can be applied to these different functional scopes because it is applied at the TU scope. In addition, a scope may also include parts of a word, such as a suffix or a prefix, or an individual character within a specific language, such as the letter "a" in English. Scopes such as these below the TU scope cannot use differentiation since it measures TUs for their ability to restrict an object range within a given language.

An optional intersection 103 between the differentiated list and the repository word list, such as Windex, can be used if required by an implementation. Windex is discussed in "SYSTEMS AND METHODS FOR INDEXING INFORMATION FOR A SEARCH ENGINE", U.S. application Ser. No. 12/192,794, filed 15 Aug. 2008, the disclosure of which is hereby incorporated herein by reference in its entirety.

Lists for differentiation can be kept up-to-date by intersecting list and using only those terms that are in the term-encoding scheme. Especially useful in data caches, since these have limited memory and there is no reason to store an entire differentiated list for a language if the current repository does not contain the term. Updating can be triggered in real-time with new addition(s) to the repository word list or Windex, which is a simple binary search of the differentiated list.

A test to see if differentiable terms exist in the input 104 is performed next. If a differentiated term exists, then a term extraction process can begin. If no differentiated term exists, then there is no raw material to determine differentiability and the system can only apply an input value of 0. The system terminates at this point for the input 105. A message can be generated that indicates that follow on processes cannot be performed with this input because, as for a search, there is no way to differentiate the terms in the text stream input against what is used as the comparison set.

When a differentiated term exists, then 106 perform term extraction is done. The text extraction involves finding all the terms that might be used for the differentiation. This is based on what was determined for the differentiation list in 101 above. Depending on the implementation, this may involve isolation of terms that meet the similar grammatical requirement, such as all the nouns or all the verbs found in the input. It may also be based on uses of the input; some input may require testing for a specific set of terms, and these may not fall into a single grammatical category like POS. Terms are extracted and any appropriate filters, such as a grammatical category, applied as part of term extraction process to eliminate terms that will not be used in the differentiation process. Normally, the input may using a single differentiation test, but any number may be applied. A differentiation test may be unary, binary or n-ary in nature, and the differentiable list is usually equal to the control set when the comparison is made. However, tests can be done when a document has passed through the differentiation testing process or with one that has no such test. Binary and n-ary tests occur when the term extraction process indicates that there are both single word and multi-word terms that can comprise the terms. This generally occurs in most implementations of differentiation testing. Therefore, the extraction 106 should result in a list of phrases as well as single words that are used by the differentiation tests.

Then, the process for assigning differentiation weights/scores 107 can begin. The term length is generally recorded as part of the process, so a term as at least 1 term unit (TU) or word (as in English). Depending on the implementation, there may be several stages of differentiation testing at this point, set up by the grammatical or functional boundaries inherent in the extracted terms. A noun that ends a multi-term set may be used, or a verb may be used, or a set of terms found in a list may be used, depending on implementation. For instance, a set of time indicators may be found to be differentiators for a given implementation. These are generated as a list, and the check to see if any of the terms, regardless if they are in a phrase or not. In English, a verb phrase has auxiliary and main parts; only the main part is generally tested for differentiation since auxiliary verbs are used more frequently. In some cases, both verbs and nouns can be used, such has when there is a set of functions that needs to be differentiated for a device, such as the an example differentiation list equal to "play, run, stop, start, pause", where it is possible that different inflections can refer to the same button or some other feature of the device. The weight given to each term found in the input is based on this list. In this example, the differentiation list may score a phrase "play the DVD" higher than "stop the DVD" because the DVD must be played before it can be stopped. Therefore, the weight in the differentiated list would be higher for "play" and "run", but lower, for "start", "stop", and "pause".

Determining the score/weight 107 usually takes place at TU level, but may be done with any character that maps to an identifiable unit in a specific language. Each TU in input is intersected with the differentiation control set. Each TU can be graded based on any linear arrangement, and may be a simple binary value (0,1) or a more complex system that takes into variations in differentiation; in some cases, this may be based on the differentiable list suitable for the process. Each TU in a grammatical scheme is either a noun, modifier, adverb, or other language classification based on the individual function of a word—usually a noun-based test is sufficient as verbs might generally classified as nondifferentiable. This can be changed as required, as when the function of a device is used as in the example above.

For some implementations, an object test is the major differentiator test, since it is the most important element. An object is usually a noun, but depending on implementation may also be a subset of a noun or may include verbals or other terms that are functioning as a noun in a particular text stream input. The object functions would get a higher score and impact the score for a multi-word test more than a modifier test, if used. Such a follow-on modifier test may be used to determine differentiation only when part of a larger set of terms, as it serves to restrict the set of possible objects referred to by the object. Note that these are not a required part of the measurement, as the noun is still the most important determiner of differentiation when an object test is required. However, a more precise test will generally require adjectival differentiation. This may also be measured along grammatical lines, such as which modifier has more impact on limiting the object in question. For many implementations, associations, substitutions, and other such similarity tests may be used to group like terms together to weight differentiated terms similarly; this varies with implementation requirements. Also, some prefixes and suffixes in some languages will require attention when compared against other terms with the same root words. This process also may affect the outcome of a process that has sensitivity in this area, such as sentiment analysis, feature-based analysis, and abstractions. Therefore, a weight may be assigned to it as well to distinguish its differentiation when the differentiation list does not contain prefix and suffix variations. These may be applied to the modifier relation to an object, or they may be applied to the object itself depending on where it occurred in the input.

Several examples follow. The differentiation list for these examples=(acoustic, paint). The weighting is a simple binary scale that adds an additional weight when the object value is differentiable, and adds a one when a term is differentiable, regardless where it occurs in the input. Example 1 is "special qualities"=nondifferentiable (both individually and as an multi-word term), but it is still more differentiable than a nondifferentiable single word (weight 0 or norm). Example 2 is "special (nondifferentiable) acoustics (differentiable)" and the term is differentiable because of the object value (acoustics). Weight=2, since the object is higher than the nonobject. Example 3 is "acoustical (differentiable) qualities (nondifferentiable)" and is differentiable but less differentiable than the object that has a differentiable value, making the weight=1 (e.g., less than the object version). Example 4 is "acoustical (differentiable) paints (differentiable)" is differentiable and is the most differentiable of any phrase or multi-word term since all members are differentiable (weight=3).

Once all the terms have been differentiated, then they can be grouped together based on some criteria 108. This step is optional. One approach is the creation of groups based on term length (cardinality). There are usually at least two group types, the single and the multi-word term. In the single TU, the score doesn't have other factors unless the function or POS is considered. There are implication issues and these affect the classification system in POS-based implementations. In multiple-unit terms, the end or terminating object is weighted more than other TUs in length. Modifiers or terms are measured and scored for each multiple unit term. Each unique group has an individual score, along with each component of an multiple-unit term. For example, an input is "the dog went shopping at the Cordova Mall." Terms that are in the exemplary filter=dog, shopping, cordova, mall (no functional words or verbs are being used in this exemplary basic filter measured for differentiation. These are considered nondifferentiable for this implementation). Each term is analyzed for differentiation as follows: Dog=differentiable; Shopping=nondifferentiable; Cordova=differentiable; Mall=nondifferentiable. Cordova mall in the example is an multi-word term so its scores are combined. In the binary world, it gets a score of 1. This means that it has a differentiable member. Note that the terminating object is nondifferentiable. If it were differentiable, it would get a special weight, and the score would be higher.

An optional input score 109 can be calculated for an entire input by using a summation, division, multiplication, other mathematical method based on the input size, output requirements, and other implementation-specific data. Each differentiable term of the input participates in the final score for most purposes. Using the list in the example above of "acoustic" and "paint", and an input: "Acoustical paint has been found to be useful". In this input, the differentiated multi-word term is equal to "acoustical paint". This score based on 107 is equal to 3, since both terms are differentiable and the term "paint" is an object, using an object scoring system as shown above. A score can be generated for the entire input based on implementation; for this example, a score for the input may be based on the number of differentiated terms that have been located within the set of object and modifier-object term sets. In this example, the addition term (a modifier) to be considered is "useful", which has a score of 0. Therefore, the score for this input would be equal to 3. Depending on implementation requirements, a deduction could be made for this term since it is undifferentiated, such as subtracting one from the initial phrase, giving the score for this a 2. It is also possible to assign weights based on function; since the term "useful" is not an object, maybe only half a point is subtracted, making the score 2.5. This is useful to gauge the input as a whole and how useful it might be in different situations. For instance, for a search term, only the differentiated portion of the input is used, and that should be reflected in those term(s) that make up the input score. The other terms may be safely dropped in many implementations since they will not help locate documents that meet the input.

One use of differentiation tested may be to analyze a topical outline. A branch of the outline is considered to start at the top node or the chosen topic. The topic may or may not have enough differentiation to convey a meaning that is related to the underlying document. In this case, the topic path is augmented by differentiation-based multi-word terms and single words that provide this important information in the form of subtopics to each topic that requires this differentiation. The root of the path may or may not be differentiable. The ability to provide this information is important for summarized, argumentation documents like job descriptions, marketing communications, and even summaries of larger documents. A quick view can be generated for such documents based on the augmented differentiation information and may be a small subset of the full topical outline. The quick view can give significant information without having to read a lot of extraneous words and still provide an overview of a document. This can be done in outline form, giving several subtopics that contain differentiable information about each parent topic. Any number of topics in the chain can be augmented using differentiation and therefore can build any number of quick views. For further information on topical analysis please refer to "SYSTEMS and METHODS OF TOPICAL ANALYSIS", filed on 29 Nov. 20128, Ser. No. 13/689,656, which is incorporated herein by reference in its entirety.

Another use of differentiation testing involves listings of product features. In some instances, the descriptions of features of a product use nondifferentiable labels, such as best, perfect, etc. This is also true of various other marketing documents or collateral. These labels may or may not contain actual data that is useful for a particular analysis, and the need is to determine what differentiable features are necessary to show the user why a certain product is better than another product. Feature extraction, in generic terms, is the ability to ascertain characteristics about a focus object, such as a camera or a lawn mower. Most nondifferentiable descriptors do not impart any actual meaning with respect to the object's characteristics; rather, they qualify such features in a judgmental fashion that may not concur with the current viewer/user.

Corrections to an input 110 are optional and may be performed by differentiation testing to make the input more usable. For instance, a calling function wants to compare two documents that contain a lot of flowery language but the information required is of the feature of the robot to perform a certain task. Most of these flowery words such as quality, feature, etc. are not helpful for running a search and need to be located and separated from those terms that are helpful, such as line of sight requirements, range of motion, and actuator arm. These are the differentiators that will make the comparison beneficial to the task at hand. These terms then isolated in each document. A comparison is made, and an initial decision can be made if there is enough information to proceed with more in-depth analysis. Any types of corrections to the inputs with respect to differentiation may be used in any number of information retrieval schemes. For instance, removing non-important portions to send to a search engine can be considered; in the example "Acoustical paint has been found to be useful", only the differentiated terms "acoustical paint" would be sent to a search engine to find documents that relate to that kind of paint.

Lastly, the data can be returned 111 in any number of forms since there are several different ways in which an input can be characterized. It can return the differentiated part of the input only (as in acoustical paint above). This is useful for information retrieval tasks and other such data analysis that depends on being able to find a distinguishable point from which to perform a set of functions. Another return may be to indicate the differentiated portions in the return using any number of methods, such as encoding the output to show the differentiated portions. Any such returns may also indicate the weights and/or scores for each individual component of the input as well as optionally for the entire input. The returned data may be presented to a user, via a display, or other man-machine interface, or the returned data may be provided to another program application that uses the returned data as input for further processing.

The returned data may be used to determine if a secondary process can be successfully run or if more information is required about the input. This is especially true when automated processes are in place and human intervention is not feasible for a given business environment. For instance, a set of messages are going to be compared against a control message, such as filter that needs to determine if the message is indicating that a part of a system needs to be shut down. If there is not enough information to judge whether there is a problem, then the inputer needs to be informed that the message is incomplete, which is determined by the lack of differentiated terms in the message.

Another example of this is the use of a control document as a requirements document and filter out documents that do not contain any more detailed information on such requirements. Assuming that the documents must have the information, then it is required that the inputer be informed that a document does not meet the requirements—this is solved by using differentiation. Therefore, a message can be raised to the user without any human intervention. These scenarios can be solved with the use of differentiable measure that determines the suitability of a document to perform the particular task at hand. In order to accomplish this, differentiation testing can be used in order to develop a metric that a document can be measured.

A system example follows. There is a single document in the repository, and the document contains the following text: "The use of acoustic paint is necessary in sound-sensitive environments to remove ambient sound from test equipment for hearing tests. This removes the expense of hearing booths." The differentiation is being used to build a set of search terms that will allow the system to distinguish between other documents such that documents that contain similar information can be found automatically.

The system has to first build the differentiated list 101. This is done by performing differentiation on the language being used for the possible inputs from the user. Depending on implementation, this list contains all the possible differentiatable terms for that language at the point of time of system invocation. This process may be done at different points in time based on system requirements.

The system gets the input from the requestor 102, which contains the single document in the repository as illustrated above. The document is then reduced to a set of terms that are separated by POS or other such grammar function. In this case, only the nouns and modifiers will be used. The complete set of terms ignores functional words, since they are typically undifferentiated in a language. The list is equal to "use, acoustic, paint, necessary, sound-sensitive, environments, remove, ambient, sound, test, equipment, hearing, booth". This list represents the repository word list, and then it is intersected with the differentiated list 103 to determine if there are any terms that are considered differentiatable in this exemplary system.

In this case, the intersection does cause differentiable terms to exist, 104. This list is equal to "acoustic, paint, booth". Once this list has been found, then the terms are extracted in their full form, including any phrases in the above text, the text extraction 106 produces the results: "use", "acoustic paints", "necessary", sound-sensitive environments", "remove", "ambient sound", "test equipment", "expense", "hearing booths". Note that the term extraction may treat prepositional phrases and infinitives differently based on implementation requirements.

Each term is then processed for differentiable score weights 107 based on the term extraction results. For this example, a simple binary system is employed as illustrated above. For this application of a search term, only those found to have differentiatable scores equal or above 1 will be used. The first term "use" is nondifferentiated, so it gets a score of 0 and is not used as a search term. The second multi-word term "acoustic paints" is differentiated, where both terms are also individually differentiated, getting the score of 3, and is therefore used as a search term. The third term "necessary" is not differentiated, so it gets a score of 0 and is not used as a search term. The fourth multi-word term "sound-sensitive environments" contains only nondifferentiatable terms, but since it contains multiple terms it gets a score of 1. It is used as a search term. The fifth single-word term, "remove" is not differentiated, and therefore gets a score of 0 and is not used as a search term. The sixth term "ambient sound" is also nondifferentiated, but contains more than one term so it gets a score of one and is used as a search term, as is the seventh term "test equipment". The eighth term "expense" is a single term that is non differentiated, and gets a score of 0 and is not used as a search term. The last term, "hearing booths", contains a differentiated object and gets a score of 2, and is used as a search term.

In this process, there is no grouping that is required so the optional 108 is not used. If there is a need to calculate an input score 109, it can be done here by determining the document score to determine how differentiatable the document is and how good its group of search terms will be. In this example, the document score will be the number of terms that are differentiated over the total number of terms. There are 9 terms in this example, and 5 are differentiated. It would get a score of 5/9, which is a moderate differentiated score for a document. In this case, no corrections to the input are required. The output 111 is the five differentiated terms: "acoustic paints", "hearing booths", "sound-sensitive environments", "ambient sound", "test equipment" in order of their differentiated scores.

Figure 2:
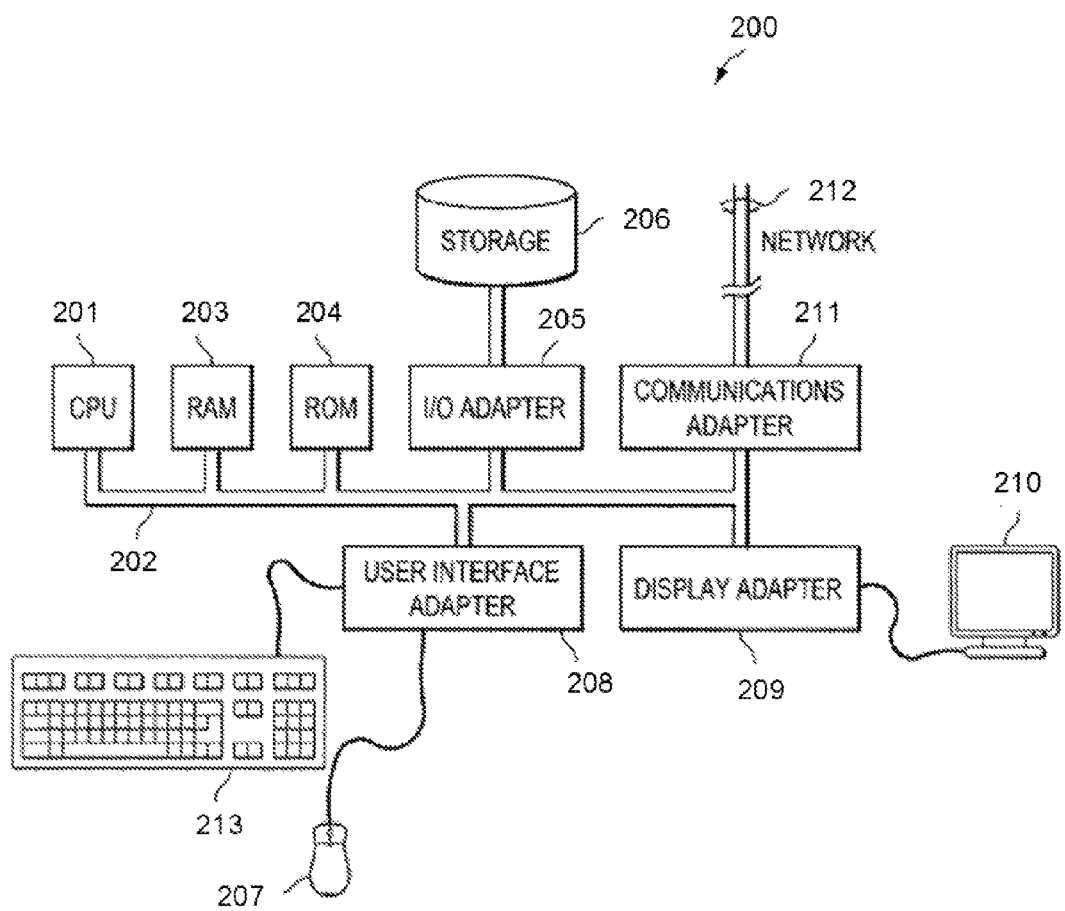
FIG. 2 depicts a block diagram of a computer system which is adapted to use the present invention.

FIG. 2 illustrates computer system 200 adapted to use the present invention. Central processing unit (CPU) 201 is coupled to system bus 202. The CPU 201 may be any general purpose CPU, such as an Intel Pentium processor. However, the present invention is not restricted by the architecture of CPU 201 as long as CPU 201 supports the inventive operations as described herein. Bus 202 is coupled to random access memory (RAM) 203, which may be SRAM, DRAM, or SDRAM. ROM 204 is also coupled to bus 202, which may be PROM, EPROM, or EEPROM. RAM 203 and ROM 204 hold user and system data and programs as is well known in the art.

Bus 202 is also coupled to input/output (I/O) controller card 205, communications adapter card 211, user interface card 208, and display card 209. The I/O adapter card 205 connects to storage devices 206, such as one or more of a hard drive, a CD drive, a floppy disk drive, a tape drive, to the computer system. The I/O adapter 205 is also connected to printer (not shown), which would allow the system to print paper copies of information such as document, photographs, articles, etc. Note that the printer may a printer (e.g. inkjet, laser, etc.), a fax machine, or a copier machine. Communications card 211 is adapted to couple the computer system 200 to a network 212, which may be one or more of a telephone network, a local (LAN) and/or a wide-area (WAN) network, an Ethernet network, and/or the Internet network. User interface card 208 couples user input devices, such as keyboard 213, pointing device 207, and microphone (not shown), to the computer system 200. User interface card 208 also provides sound output to a user via speaker(s) (not shown). The display card 209 is driven by CPU 201 to control the display on display device 210.

Note that any of the functions described herein may be implemented in hardware, software, and/or firmware, and/or any combination thereof. When implemented in software, the elements of the present invention are essentially the code segments to perform the necessary tasks. The program or code segments can be stored in a computer readable medium. The "computer readable medium" may include any physical medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. The code segments may be downloaded via computer networks such as the Internet, Intranet, etc.

Embodiments described herein operate on or with any network attached storage (NAS), storage array network (SAN), blade server storage, rack server storage, jukebox storage, cloud, storage mechanism, flash storage, solid-state drive, magnetic disk, read only memory (ROM), random access memory (RAM), or any conceivable computing device including scanners, embedded devices, mobile, desktop, server, etc. Such devices may comprise one or more of: a computer, a laptop computer, a personal computer, a personal data assistant, a camera, a phone, a cell phone, mobile phone, a computer server, a media server, music player, a game box, a smart phone, a data storage device, measuring device, handheld scanner, a scanning device, a barcode reader, a POS device, digital assistant, desk phone, IP phone, solid-state memory device, tablet, and a memory card.

The invention claimed is:

1. A computing device comprising:
one or more processors; and
a non-transitory, computer-readable medium storing programming executable by the one or more processors, the programming comprising instructions to:
receive an input data set from an originator;
parse the input data set into a plurality of term units (TUs), wherein each TU of the plurality of TUs is a word, a number, or a symbol;
for each TU of the plurality of TUs, determine whether the TU is differentiable or non-differentiable based on a grammatical scheme or a functional scheme, wherein the grammatical scheme comprises classification as a noun, a modifier, an adverb, or a verb, and the functional scheme comprises classification based on a linguistic functional scope;
for each TU of the plurality of TUs, assign a score based on differentiability; and
transmit a plurality of differentiability-scored TUs to the originator, wherein the plurality of differentiability-scored TUs are configured for the originator to use the plurality of differentiability-scored TUs in a topical analysis and a search of the input data set.

2. . The computing device of claim 1, wherein the linguistic functional scope comprises a type of writing or a style of writing.

3. The computing device of claim 1, wherein the programming further comprises instructions to group differentiability-scored TUs based on a predetermined criterion.

4. The computing device of claim 1, wherein the computing device comprises a computer, a laptop computer, a personal computer, a server computer, a personal data assistant, a camera, a phone, a cell phone, a mobile phone, a smart phone, a tablet, a media server, a music player, a game box, a data storage device, a measuring device, a handheld scanner, a scanning device, a barcode reader, a point-of-sale (POS) device, a digital assistant, a desk phone, an Internet Protocol (IP) phone, a solid-state memory device, or a memory card.

5. A method comprising:
receiving, by a computing device, an input data set from an originator, the input data set comprising at least one document;
parsing, by the computing device, the input data set into a plurality of term units (TUs), wherein each TU of the plurality of TUs comprises a word, a multi-word, a number, or a symbol;
determining, by the computing device, a differentiability score for each TU of the plurality of TUs, the differentiability score corresponding to whether or not each TU is differentiable, wherein:
determining the differentiability score is based on a grammatical scheme or a functional scheme;

the grammatical scheme comprises classification as a noun, a modifier, an adverb, or a verb; and
the functional scheme comprises classification based on a linguistic functional scope; and
transmitting, by the computing device, a plurality of differentiability-scored TUs to the originator, wherein the plurality of differentiability-scored TUs are configured for the originator to use the plurality of differentiability-scored TUs in a topical analysis and a search of the input data set.

6. The method of claim 5, wherein the linguistic functional scope comprises a type of writing or a style of writing.

7. The method of claim 5, further comprising grouping differentiability-scored TUs based on a predetermined criterion.

8. The method of claim 5, wherein the computing device comprises a computer, a laptop computer, a personal computer, a server computer, a personal data assistant, a camera, a phone, a cell phone, a mobile phone, a smart phone, a tablet, a media server, a music player, a game box, a data storage device, a measuring device, a handheld scanner, a scanning device, a barcode reader, a point-of-sale (POS) device, a digital assistant, a desk phone, an Internet Protocol (IP) phone, a solid-state memory device, or a memory card.

9. A method comprising:
receiving, by a computing device, an input data set from an originator, the input data set comprising a repository of digitally-rendered data including a plurality of topics;
parsing, by the computing device, the input data set into a plurality of term units (TUs), wherein each TU of the plurality of TUs comprises a word, a multi-word, a number, or a symbol;
determining, by the computing device, a first differentiability score for each TU of the plurality of TUs, wherein:
determining the first differentiability score is based on a grammatical scheme or a functional scheme;
the grammatical scheme comprises classification as a noun, a modifier, an adverb, or a verb; and
the functional scheme comprises classification based on a linguistic scope;
transmitting, by the computing device, a plurality of differentiability-scored TUs to the originator, wherein the plurality of differentiability-scored TUs are configured for the originator to use the plurality of differentiability-scored TUs in a topical analysis and a search of the input data set; and
prioritizing a set of topics based on first differentiability scores.

10. The method of claim 9, wherein the linguistic scope comprises a type of writing, a style of writing, or a linguistic functional scope for the input data set.

11. The method of claim 9, further comprising grouping differentiability-scored TUs based on a predetermined criterion.

12. The method of claim 11, wherein the predetermined criterion is provided by the computing device, the originator, or a user.

13. The method of claim 12, further comprising displaying the prioritized set of topics to a user on a user-interface device.

14. the method of claim 13, wherein the repository of digitally-rendered data comprises a plurality of documents.

15. The method of claim 14, further comprising: determining a second differentiability score for a document of the plurality of documents, the second differentiability score comprising a ratio of a first total number of differentiable TUs in the document to a second total number of non-differentiable TUs in the document.

16. The method of claim 15, wherein the computing device or the user-interface device comprises a computer, a laptop computer, a personal computer, a server computer, a personal data assistant, a camera, a phone, a cell phone, a mobile phone, a smart phone, a tablet, a media server, a music player, a game box, a data storage device, a measuring device, a handheld scanner, a scanning device, a barcode reader, a point-of-sale (POS) device, a digital assistant, a desk phone, an Internet Protocol (IP) phone, a solid-state memory device, or a memory card.

* * * * *